United States Patent [19]

Diachuk

[11] Patent Number: 4,460,386
[45] Date of Patent: Jul. 17, 1984

[54] METHOD OF SEPARATING FOREIGN MATTER FROM A GAS

[75] Inventor: Wolodymyr Diachuk, Golden Valley, Minn.

[73] Assignee: Century 21 Pollution Control, Inc., Minneapolis, Minn.

[21] Appl. No.: 431,107

[22] Filed: Sep. 30, 1982

Related U.S. Application Data

[62] Division of Ser. No. 253,311, Apr. 13, 1981, Pat. No. 4,364,754.

[51] Int. Cl.$^3$ .............................................. B01D 47/00
[52] U.S. Cl. .................................. 55/92; 55/DIG. 36; 55/222; 55/238; 55/269; 126/299 E
[58] Field of Search ................. 55/DIG. 36, 222, 180, 55/235–238, 269, 92; 126/299 E, 299 D; 165/156, 169, 109 R

[56] References Cited

U.S. PATENT DOCUMENTS

| | | | |
|---|---|---|---|
| 747,641 | 12/1903 | Roderwald | 165/156 |
| 767,721 | 8/1904 | Swartwout | 55/456 |
| 2,341,319 | 2/1944 | Graham et al. | 165/156 |
| 3,286,992 | 11/1966 | Armenlades et al. | 261/79 A |
| 3,915,679 | 10/1975 | Roach et al. | 55/347 |
| 4,038,056 | 7/1977 | Diachuk et al. | 55/DIG. 36 |
| 4,284,421 | 8/1981 | Howard | 126/299 E |
| 4,364,754 | 12/1982 | Diachuk | 55/DIG. 36 |

FOREIGN PATENT DOCUMENTS

| | | |
|---|---|---|
| 748644 | 5/1956 | United Kingdom . |
| 774791 | 5/1957 | United Kingdom . |
| 1053783 | 1/1967 | United Kingdom . |
| 1435490 | 5/1976 | United Kingdom .................. 55/269 |

*Primary Examiner*—Bernard Nozick
*Attorney, Agent, or Firm*—Burd, Bartz & Gutenkauf

[57] ABSTRACT

A hot gas cleaning and heat transfer method associated with a cooking hood assembly to separate foreign matter and liquids from gas moving through the hood assembly and transferring heat from the gas to a cooling liquid. A heat conducting wall surrounding a tubular passage accommodating a plurality of helical elements divide and direct gas into separate helical gas streams. The cooling liquid surrounds the wall to lower the temperature of the wall. Foreign matter, gas vapors, and liquids are separated from the hot gas into an annular sheath adjacent the heat conducting wall. The foreign matter, gas vapors, and liquid particles suspended in the gas are combined by mechanisms of centrifugal force, adhesion, condensation, and impaction. The gas vapors are condensed into liquid droplets. The liquid droplets, liquids, and foreign matter merge into a liquid film on the inside of the wall. This liquid film is moved down the wall and collected in an annular collecting member located adjacent the exit end of the wall. Clean gas flows through the annular collecting member to a desired location.

9 Claims, 10 Drawing Figures

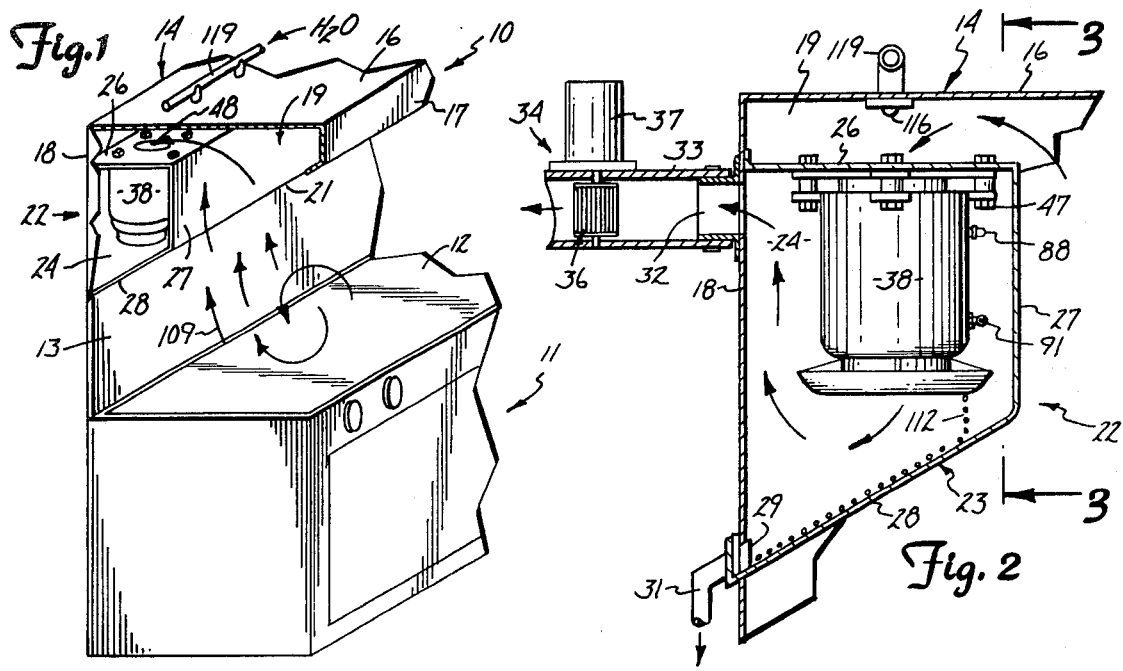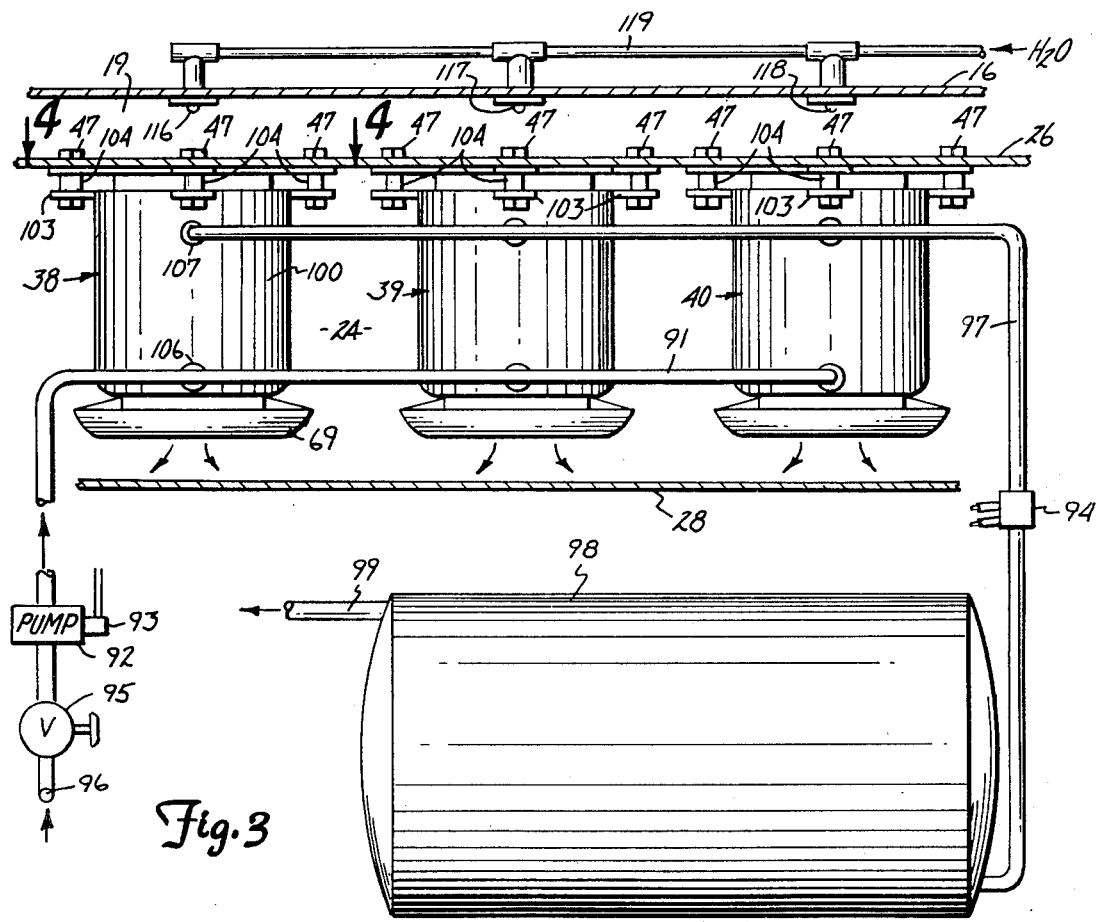

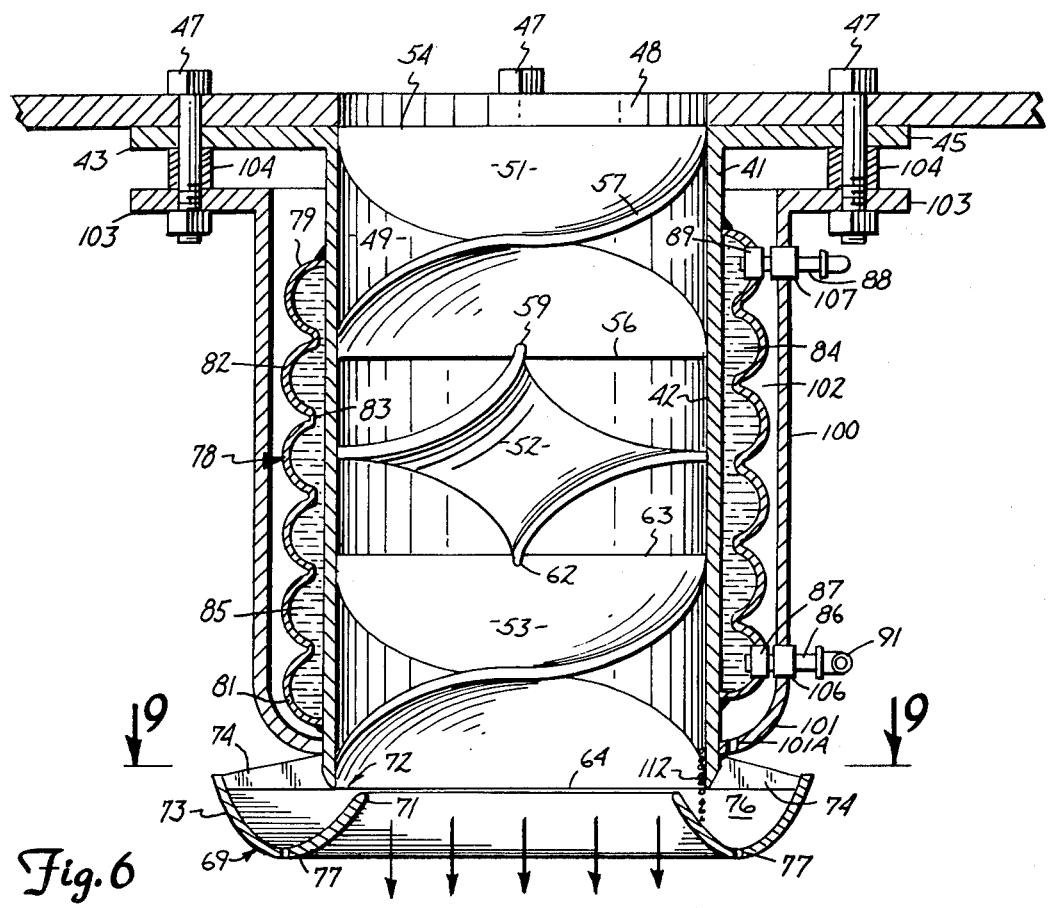
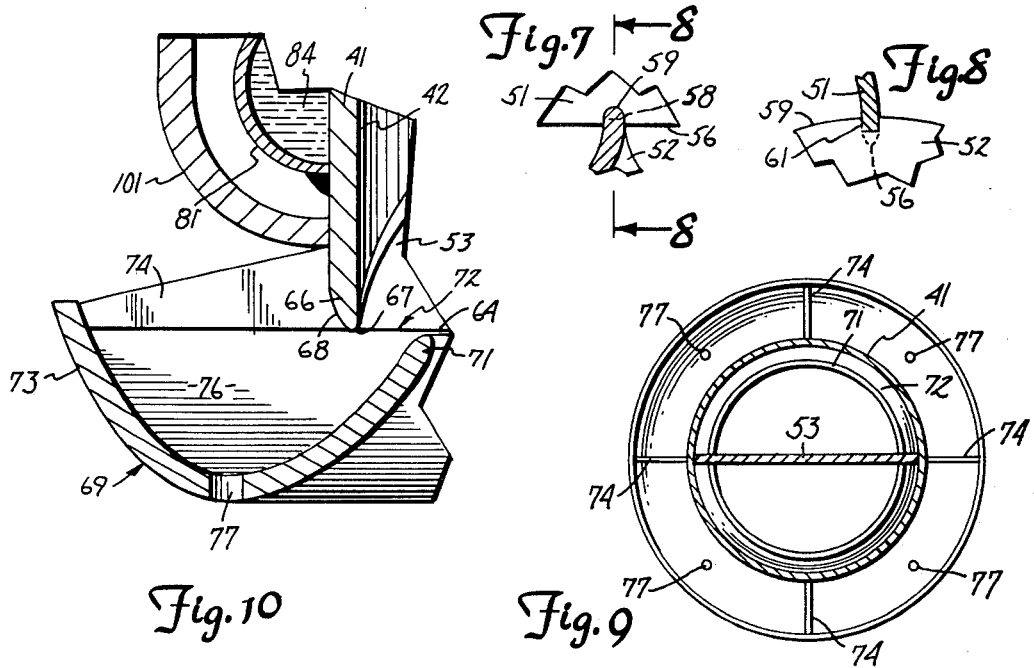

METHOD OF SEPARATING FOREIGN MATTER FROM A GAS

This Application is a division of U.S. application Ser. No. 253,311, filed Apr. 13, 1981, now U.S. Pat. No. 4,364,754.

SUMMARY OF INVENTION

The invention is related to a gas cleaning and heat transfer apparatus operable to separate foreign matter from a gas, such as air, and transfer heat from the gas to a liquid. The apparatus has a plurality of gas cleaning units that are useable with a hood assembly in a cooking environment for separating water, smoke, grease, and particulates and like foreign matter formed in the cooking operation from the hot gas and removing heat from the hot gas. The heat is transferred to a liquid, as water, for subsequent utilization, such as space heating or water heating. Each gas cleaning unit has a heat conducting cylindrical wall surrounding a tubular passage having a gas inlet and a gas outlet. A plurality of end-to-end helical elements located in the passage provide the gas moving through the passage with helical patterns of movement. As the gas passes the leading edge of each helical element, it is separated into separate gas streams. Each gas stream rotates about its own center as it flows in a helical path through the passage thereby causing the foreign matter to collect on the cylindrical wall.

A cylindrical jacket having a liquid accommodating chamber surrounds the cylindrical wall. The liquid in the chamber contacts the cylindrical wall so that heat is transferred from the wall to the liquid. The transfer of heat through the cylindrical wall causes a reduction in the temperature of the gas flowing adjacent the inside of the wall. This causes condensation of vapors, as water, in the gas. The condensed liquid picks up smoke and particulates which are collected on the inside of the cylindrical wall. The jacket is provided with a spiral rib, which facilitates helical flow of liquid in the chamber. A pump operates to move the liquid through the chamber to a location, such as a storage tank. The hot liquid can be pumped to a desired location where the heat in the liquid is utilized.

A liquid dispensing system is used in association with each gas cleaning unit to introduce a cleaning liquid or cleaning solution into the passage. The cleaning solution is carried with the gas through the passage to clean the helical elements, as well as the inside wall of the cylindrical member. The liquid dispensing system is also used as a flame extinguishing system.

IN THE DRAWINGS

FIG. 1 is a perspective view of a hood assembly equipped with the gas cleaning and heat transfer apparatus of the invention;

FIG. 2 is a side elevational view of the gas cleaning and heat transfer apparatus with the hood assembly shown in section;

FIG. 3 is an enlarged sectional view taken along line 3—3 of FIG. 2;

FIG. 6 is a sectional view taken along line 6—6 of FIG. 4;

FIG. 7 is a fragmentary view partly sectioned of the connection between adjacent helical elements;

FIG. 8 is a sectional view taken along the line 8—8 of FIG. 7;

FIG. 9 is a reduced scale sectional view taken along the line 9—9 of FIG. 6; and FIG. 10 is an enlarged sectional view of the lower left portion of FIG. 6.

DESCRIPTION OF PREFERRED EMBODIMENT

Figure 4:
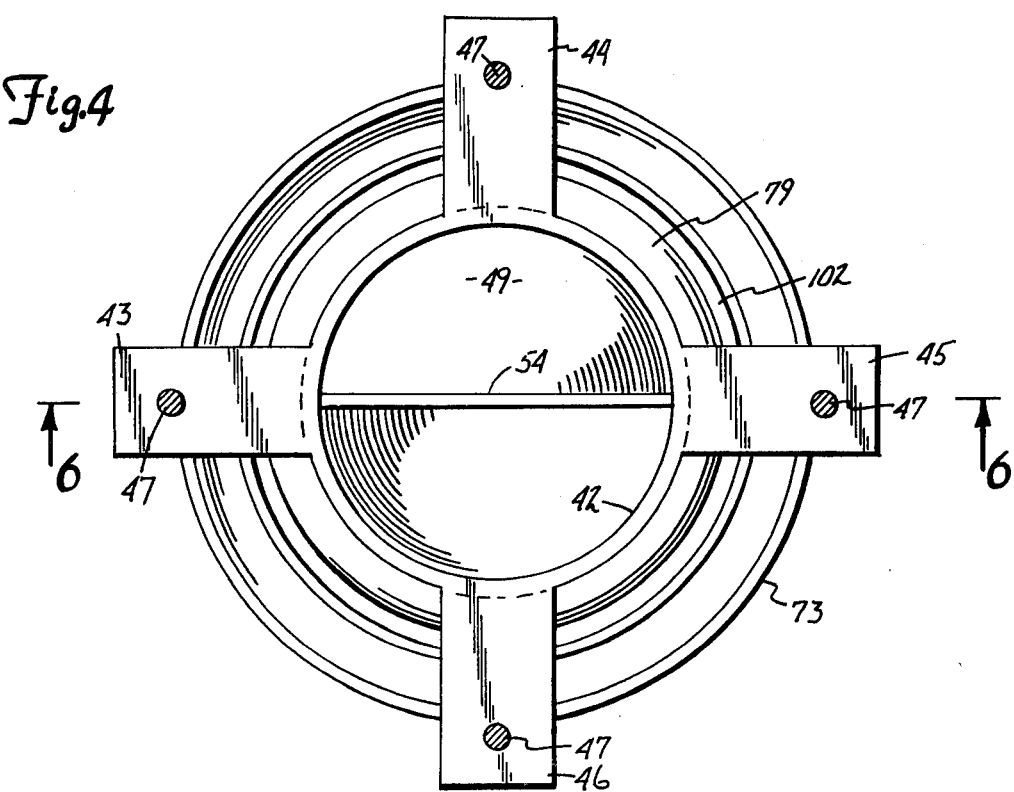
FIG. 4 is an enlarged sectional view taken along line 4—4 of FIG. 3.

Referring to FIG. 1, there is shown a hood assembly indicated generally at 10 located over a cooking unit 11 for collecting hot gases, water, smoke, grease and particulates formed in the cooking operation. Cooking unit 11 has a generally horizontal grill or flat heated plate 12. Heated plate 12 is used to cook food, such as pancakes, meat products, eggs, grits, and the like. Cooking unit 11 can be a fryer, oven, or broiler. A space 13 above grill 12 has a front opening to allow access of the cullinary personnel to grill 12. Hood assembly 10 extends over the top of space 13. Hood assembly 10 has a housing indicated generally at 14 mounted on a support (not shown), such as a wall or frame structure extended upwardly from cooking unit 11. Housing 14 has a generally flat top wall 16 joined to a downwardly directed front wall 17 and a rear wall 18. Walls 16-18 surround a chamber or passage 19 having a bottom oopening 21 facing the grill 12.

A fluid cleaning assembly indicated generally at 22 located in the rear portion of passage 19 is mounted on rear wall 18. Fluid cleaning assembly 22 operates to separate foreign matter, as particulates, grease, smoke and the like foreign matter from the hot gas flowing through the assembly. Cleaning assembly 22 has a housing or casing comprising a top generally horizontal top wall 26 located below top wall 16 of the hood housing, a downwardly directed front wall 27, and a downwardly and rearwardly inclined bottom wall 28. Walls 26-28 surround a chamber 24. As shown in FIG. 2, wall 18 adjacent bottom wall 28 has an outlet or drain port 29 through which liquid and liquid-like materials separated from the gas in cleaning assembly 22 flow from chamber 24 and drain to a discharge tube 31. Tube 31 leads to a collection can or container (not shown). The upper portion of housing 22 has a gas outlet port or passage 32 leading to a duct 33 for carrying gas, such as air, to a desired location. Gas moving means indicated generally at 34 functions to draw gas through chamber 24 and discharge the gas through duct 33. Gas moving means 34 is diagrammatically shown as a rotating fan or blower 36 driven by electric motor 37. Other types of gas moving units, such as one or more motor driven blower units, can be used to draw gas through chamber 24.

As shown in FIG. 3, a plurality of gas cleaning units 38, 39 and 40 are located in chamber 24. The number of gas cleaning units in chamber 24 can vary in accordance with the length of the chamber. Gas cleaning units 38-40 are identical in construction. The following description is directed to cleaning unit 38, as shown in FIGS. 4-9. Gas cleaning unit 38 has an interior cylindrical casing or tube 41 having an inside cylindrical surface 42. Tube 41 has a heat conducting cylindrical wall of metal, such as stainless steel, copper and the like. A plurality of outwardly directed arms 43, 44, 45, and 46 are secured to the upper end of tube 41. Nut and bolt assemblies 47 secure the arms 43-46 to top wall 26.

Referring to FIG. 6, top wall 26 has a cylindrical hole or opening 48 aligned with the cylindrical passage 49 formed by the inside surface 42 of tube 41. A plurality of end-to-end helical elements 51, 52, and 53 are located in passage 49. First helical element 51 has a leading transverse edge 54 located below opening 48 in wall 26. Element 51 has a 180 degree twist with a trailing transverse edge 56 located in generally the same plane as the leading edge 54. Element 51 has an outer helical edge 57 that is located in engagement with the inside cylindrical surface 42 of tube 41. The trailing edge 56 has a center notch 58 accommodating a notch 61 in leading edge 59 a helical element 52. As shown in FIG. 7, leading edge 59 has a rounded or semi-circular shape. FIG. 8 shows the trailing edge 56 as having a converging or feathered shape. Leading edge 59 of second element 52 is oriented 90 degrees relative to the trailing edge 56 of first element 51. Second element 52 has a trailing edge 62 that is circumferentially oriented 90 degrees relative to a leading edge 63 of the third element 53. Third element 53 has a lower transverse edge 64 located and generally aligned with the lower end of tube 41. Helical elements 51, 52, and 53 have the same twist or helical turn. They are circumferentially oriented 90 degrees relative to each other so that, as the gas, smoke, water and particulates entrained in gas move through passage 49, the gas stream is divided into separate helical streams. The centrifugal forces on the smoke and particulates carried by the gas are separated from the gas and collected on the inside surface 42. The particulates and water will flow down with the moving gas to the lower or exit end 66 of tube 41. The longitudinal length of each helical element is about one and a half times the diameter of the element. Other size relationships between the length and diameter of the helical elements can be used. Helical elements 51, 52, and 53 can have twists other than 180 degrees. For example, twists of 30 degrees, 45 degrees, 60 degrees, 90 degrees, 120 degrees, 150 degrees and others can be used for each helical element. The number of helical elements in each tube varies with the length of the tube.

An annular member or material collecting ring indicated generally at 69 is located adjacent the lower or exit end of tube 41. Member 69 has an inner end 71 spaced inwardly from the exit end 66 of tube 41 providing therewith an annular throat 72, as shown in FIGS. 6, 9, and 10. As shown in FIG. 10, inner end 71 is located a short distance below the lower end 67 of tube 41. End 71 has a convex curved shape to minimize turbulence and gas pressure build up in the throat or annular passage 72. End 67 has a convex curved shape and an arcuate outside portion 68. Portion 68 provides a smooth, curved surface joined to the outside surface of tube 41 and eliminates a sharp outer edge which causes turbulence and an obstruction to gas flow through annular pocket passage 76. Member 69 has an upwardly and outwardly curved outer end 73 spaced outwardly from end 66 of tube 41. A plurality of connecting members or plates 74 secure annular member 69 to tube 41. The mid-portion of annular member 69 has a plurality of holes 77 which allow the liquids and fluid-like materials collected in annular pocket or recess 76 to drain onto bottom wall 28. A tubular member or pipe can be directly connected to annular member 69 to carry the liquids and fluid-like materials to a storage container.

Figure 5:
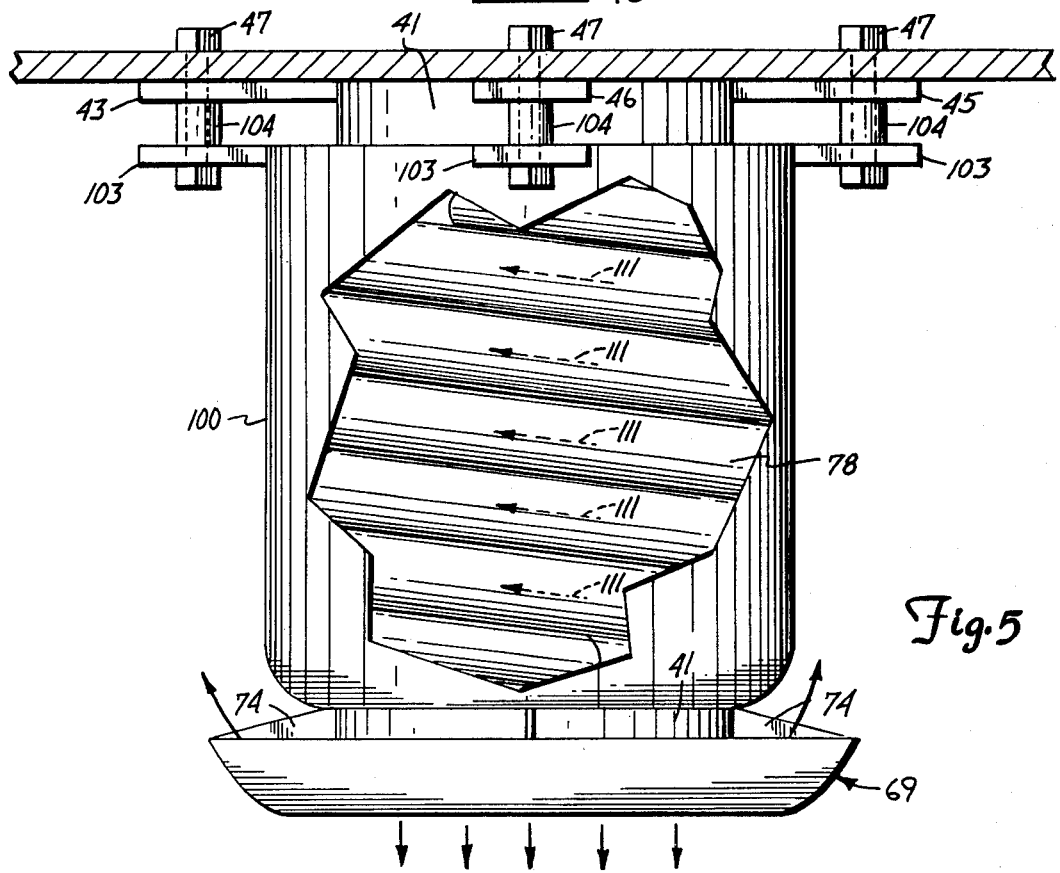
FIG. 5 is a side elevational view of the gas cleaning and heat transfer apparatus with parts broken away to show the inside jacket.

As shown in FIGS. 5 and 6, a cylindrical jacket 78 surrounds tube 41. Jacket 78 has an upper end 79 and a lower end 81 secured by welds or the like to the outer surface of tube 41. A spiral or helical-shaped side wall 82 extends between upper end 79 and lower end 81. Side wall 82 has an inwardly directed spiral rib 83 that is located close to the outside wall of tube 41 and a spiral passage 84 accommodating a liquid 85, as water, ethylene glycol and the like. Tube 41, being metal, transmits heat from the hot gas moving through passage 49 to liquid 85. A copper spiral tube carrying water can be wound around tube 41 to pick up heat from the tube 41.

As shown in FIG. 6, a connector 87 joins a liquid inlet tube 86 through a liquid inlet pipe or manifold 91. Pipe 91 extends adjacent cleaning units 38, 39, and 40 and feeds liquid to the units. Returning to FIG. 3, a pump 92 driven by an electric motor 93 functions to regulate the flow of liquid through the spiral passage 84. Motor 93 is connected to a thermostatically responsive control 94 whereby the speed of motor 93 is regulated in response to the temperature of the liquid flowing from the cleaning units 38, 39, and 40. An on-off valve 95 in the inlet supply pipe 96 is used to manually control the flow of liquid in the system. The on-off valve 95 can be used in lieu of the pump 92 to provide manual control for the flow of liquid through the liquid carrying passages 84 of cleaning units 38–40.

Returning to FIG. 6, the upper end of side wall 82 carries an outlet connector 89 joining a liquid outlet tube 88 through an outlet pipe or tubular member 97. Pipe 97 is connected to each of the upper ends of each of the cleaning units 38–40 and leads to a storage tank 98 used to store the hot liquid. An outlet tube or pipe 99 connected to tank 98 carries the hot liquid to a selected location, such as heating radiators or a hot water supply system.

A sleeve 100 surrounding jacket 78 provides insulating means or a heat barrier. Sleeve 100 is an elongated cylindrical member that is preferrably of heat insulating material, such as ceramic or brick. Sleeve 100 may be a metal member. Sleeve 100 has a lower inwardly turned end 101 that engages the lower end of tube 41. End 101 has one or more drain holes 101A allowing liquid to drain from space 102 into pocket 76. The upper end of sleeve 100 has outwardly directed flanges or ears 103 that accommodate the nut and bolt assemblies 47. Spacers 104 surrounding the nut and bolt assemblies 47 separate ears 103 from arms 43–46 and transmit the clamping force of the nut and bolt assembly 47 to both arms 43–46 and ears 103. Sleeve 100 has a diameter greater than the diameter of the side wall 82 and forms therewith an annular air space 102. The air space 102 and sleeve 100 serve as a heat barrier to minimize the transfer of heat from the side wall 82 into the air moving through chamber 24. Grommets 106 and 107 mounted in holes on sleeve 100 accommodate liquid inlet tube 86 and liquid outlet tube 88.

Returning to FIG. 3, a liquid, as water, is dispensed into the passage 19 above each of the openings 48. The liquid can be a cleaning solution, such as a detergent or sanitizer, used to wash the helical elements and cylindrical inside wall 42. The liquid can also be used to control the temperature of the gas flowing through the cleaning units 38, 39, and 40 and extinguish any fire in the cleaning units. The liquid is dispensed through nozzles 116, 117, and 118 mounted on the hood top wall 16. Each nozzle 116, 117, and 118 is connected to a manifold or feed pipe 119 leading to a source of liquid under pressure. Pipe 119 is connected to suitable controls, including valves (not shown), which can be operated to control the flow of liquid in pipe 119. The liquid is subjected to pressure so that it flows through the nozzles 116, 117, and 118 and is dispensed as a spray or mist into the passages 49 of tubes 41.

In use, gas moving means 34 is operated by motor 37 to move gas through the hood assembly 10 and discharge clean gas to a desired location, such as a gas treating module or the environment surrounding the cooking unit. The gas, as shown in FIG. 1, is moved from space 13 above grill 12, as indicated by the arrows 109, into passage 19 of hood assembly 10. The moving gas picks up the foreign matter, such as water, particulates, grease, smoke and odors generated by cooking food products on grill 12. The foreign matter is entrained in the gas and are moved with the gas through the openings 48 in the top wall 26 of fluid cleaning assembly 22.

Referring to FIG. 6, the gas moves down through the cylindrical passage 49 of tube 41. Helical elements 51, 52, and 53, being oriented 90 degrees with respect to each other, divide the gas stream into separate gas streams. The leading edge of each element divides the gas stream into two separate gas streams. The twist of the helical element causes the gas to move in spiral flow patterns. This subjects the foreign matter carried by the gas to centrifugal force causing the foreign matter to move outwardly against the cylindrical surface 42 of tube 41. At each succeeding helical element, the air streams are further divided. The number of air stream divisions produced is 2n, where n is the number of helical elements.

The geometry of the helical twist of the helical elements 51, 52, and 53 produce rotational circulation of the gas stream about the pneumatic axis of each helical gas stream. This produces additional centrifugal force on the foreign matter, driving the foreign matter into engagement with the inside surface 42.

The gas moving through passage 49 is at a temperature above the atmospheric temperature due to the heat from the grill 12. Part of the heat in the gas is transferred to tube 41. This results in a drop in the temperature of the gas and an increase in the temperature of the tube 41. Tube 41 is cooled by liquid 85 in the helical passage 84. The cool tube 41 enhances the transfer of heat from the gas through tube 41 and to liquid 85. When the particulates, water vapors, and the like approach and contact cool tube 41, they condense and merge into liquid droplets, which are collected on surface 42. The condensation is caused by a drop in the temperature of the gas and foreign matter in the gas adjacent the inside surface 42 of tube 41. The centrifugal force acting on the foreign matter concentrates the foreign matter adjacent the inside surface 42 of tube 41 and facilitates the condensation process.

The gas cleaning unit 38 utilizes a number of mechanisms to remove the foreign matter from the air. The mechanisms include the centrifugal force, gravity, inertial compaction, direct interception, absorption, and coagulation. These mechanisms function in conjunction with the condensation of gases into liquids caused by the cool tube 41. Liquids and particles, along with the condensed liquid droplets, will collect on the inside surface 42 and flow downwardly to material collector ring 69. The dry particles, as dust and smoke, will be moved under the influence of centrifugal force into engagement with the inside surface 42 and mix and impinge on the liquid droplets. The liquid droplets function as an adhesive or collective agents which retains the dry particulates and remove the particulates and smoke from the gas stream. Odor molecules, pollens, and the like will also impinge and adhere to the collected liquid droplets.

Material collecting ring 69 functions to catch the collected foreign matter as it leaves the lower end of tube 41. An annular sheath of gas moves through annular throat 72 between the inlet end or lip 71 of annular ring 69 and the lower edge 66 of tube 41. This accelerates the gas and carries collected matter 112 down into pocket 76 of ring 69. The collected matter, being liquid or semi-liquid, flows through holes 77 and along bottom wall 28 through drain hole 29. Tube 31 carries the collected foreign matter to a collection container. As shown in FIG. 10, pocket 76 located between collecting ring 69 and lower end 67 of tube 41 increases in width from throat 72. This causes a reduction in the speed of the gas flow, which enhances the retention of the foreign matter in pocket 76. The cooled and clean gas in the central portion of passage 49 flows through the center hole in ring 69 and is drawn by gas moving means 34 through exit passage 32 and discharged in a desired location.

Pump 92 driven by motor 93 delivers liquid, such as water, to spiral passage 84 of jacket 78 of each gas cleaning unit. The liquid moves in a spiral pattern, as shown by arrows 111 in FIG. 5. As the liquid moves over the outside surface of tube 41, it picks up the heat from the tube 41 thereby lowering the temperature of tube 41 and gas in the passage 49. The heated liquid is carried by return pipe 97 to storage tank 98. The heated liquid in tank 98 is useable for heating and cleaning purposes. For example, the heated liquid in tank 98 can be directed to a dishwasher. The liquid circulating system, being a closed system, is not subjected to contamination which would reduce the utility of the heated liquid.

The above disclosure is one embodiment of the gas cleaning unit of the invention, as incorporated in a cooking hood. The gas cleaning unit can be used with other apparatuses for accommodating gases, liquids, and like fluids and in other environments to remove foreign matter from the fluids. It is understood that changes in the materials, number of air cleaning units, and the size and length of the helical elements located in tubes 41 can be made by those skilled in the art without departing from the invention. The pitch and length of the helical elements can vary, as well as the number of helical elements that are placed in end-to-end or series in tubes 41. The angular relationship between adjacent ends of the helical elements can vary. Also, the angular positions of the opposite ends relative to each other of the helical elements can be altered. The invention is defined in the following claims.

I claim:

1. A method of removing foreign matter from a hot gas and transferring heat from the gas to a first liquid comprising: moving hot gas, gas vapors, and foreign matter carried by hot gas in a spiral flow path in a passage through an elongated cylindrical wall having a gas entrance end and a gas exit end open to said passage to provide an annular sheath of hot gas, gas vapors, and foreign matter adjacent the cylindrical wall, introducing a second liquid into the gas entrance end of said passage during the flow of gas and foreign matter carried by the gas in said passage, said second liquid being collected on said wall and carried from said wall by the annular sheath of gas, dividing the hot gas and second liquid and foreign matter carried by the gas into separate gas streams during the flow thereof in said passage, lowering the temperature of the hot gas in said annular sheath adjacent said cylindrical wall by moving said second liquid in a chamber around said cylindrical wall thereby cooling said wall, transferring heat from the hot gas in said annular sheath of gas to said second liquid thereby lowering the temperature of said hot gas, gas vapors, and foreign matter in said annular sheath of gas, condensing gas vapors moving with said annular sheath of gas into liquid droplets, merging the liquid droplets into a liquid film with said first liquid introduced into said passage, collecting foreign matter including the liquid film, carried by the gas on the said wall during the flow of gas through said passage, separating the annular sheath of gas, liquid film, and foreign matter discharged from the exit end of the wall from a stream of gas surrounded by said annular sheath of gas, and moving said second liquid to and from said cooling chamber to cool said wall with said second liquid in the chamber.

2. A method of removing foreign matter from a hot gas and transferring heat from the gas to a fluid comprising: moving hot gas, gas vapors, and foreign matter carried by the hot gas in a spiral flow path in a passage through an elongated cylindrical wall having gas entrance and gas exit ends open to said passage to provide an annular sheath of hot gas, gas vapors, and foreign matter adjacent said cylindrical wall, introducing liquid into the gas entrance end of said passage during the flow of gas and foreign matter carried by the gas in said passage, said liquid being joined with the annular sheath of hot gas, gas vapors, and foreign matter and collected on said cylindrical wall, lowering the temperature of the liquid, hot gas, gas vapors, and foreign matter adjacent said cylindrical wall by moving a cooling fluid in a chamber around said wall thereby cooling said wall and transferring heat from said hot gas, gas vapors, and foreign matter to said fluid, condensing gas vapors moving in said annular sheath of gas through said passage adjacent said wall into liquid droplets, merging the liquid droplets into a liquid film, collecting foreign matter, including the liquid film carried by the gas on said wall during the flow of gas through said passage, separating the annular sheath of gas, liquid film, and foreign matter discharged from the exit end of the wall from a stream of gas surrounded by said annular sheath of gas, collecting condensed liquid and foreign matter discharged from the exit end of said wall, and moving the fluid through said chamber.

3. The method of claim 2 wherein: the gas, gas vapors, and foreign matter carried by the gas are divided into separate gas streams with a plurality of end-to-end helical elements located in said passage.

4. The method of claim 2 wherein: the gas is drawn through said passage by means located downstream of the wall.

5. The method of claim 2 wherein: the gas and foreign matter carried by the gas are divided into separate gas streams with a plurality of end-to-end helical elements located in said passage, and including moving the fluid around said wall to cool said wall with said fluid, thereby cooling the gas in the passage.

6. The method of claim 5 wherein: the fluid is moved in a generally spiral path around said wall.

7. The method of claim 2 wherein: the cylindrical wall is cooled with a cooling liquid.

8. The method of claim 7 including: moving said cooling liquid relative to said wall during the cooling of said wall.

9. The method of claim 7 including: moving said cooling liquid in a generally spiral path relative to said wall during the cooling of said wall.

* * * * *